US008700646B2

(12) United States Patent
Brad et al.

(10) Patent No.: US 8,700,646 B2
(45) Date of Patent: Apr. 15, 2014

(54) REFERENCE FILE FOR FORMATTED VIEWS

(75) Inventors: Vladimir Brad, Ottawa (CA);
Christopher Crim, San Jose, CA (US);
David McKee, Tracy, CA (US); Stephen Iremonger, Mountain View, CA (US);
Toufic Milan, Ottawa (CA)

(73) Assignee: Apple Inc., Cupertino, CA (US)

( * ) Notice: Subject to any disclaimer, the term of this patent is extended or adjusted under 35 U.S.C. 154(b) by 417 days.

(21) Appl. No.: 12/540,056

(22) Filed: Aug. 12, 2009

(65) Prior Publication Data
US 2011/0040747 A1 Feb. 17, 2011

(51) Int. Cl.
G06F 7/00 (2006.01)
G06F 17/30 (2006.01)

(52) U.S. Cl.
USPC ............................... 707/755; 715/969

(58) Field of Classification Search
None
See application file for complete search history.

(56) References Cited

U.S. PATENT DOCUMENTS

| 4,949,287 | A * | 8/1990 | Yamaguchi et al. .......... 715/246 |
|---|---|---|---|
| 6,178,419 | B1 * | 1/2001 | Legh-Smith et al. ................. 1/1 |
| 6,226,659 | B1 * | 5/2001 | Wong et al. .................... 715/209 |
| 6,502,134 | B1 * | 12/2002 | Makarios et al. ............. 709/225 |
| 6,826,557 | B1 * | 11/2004 | Carter et al. ........................... 1/1 |
| 7,225,179 | B2 * | 5/2007 | Iwata et al. ............................. 1/1 |
| 7,281,008 | B1 * | 10/2007 | Lawrence et al. ...................... 1/1 |
| 7,467,131 | B1 * | 12/2008 | Gharachorloo et al. ............... 1/1 |
| 7,668,860 | B2 * | 2/2010 | Naibo et al. .................... 707/794 |
| 2001/0056418 | A1 * | 12/2001 | Youn ................................ 707/3 |
| 2002/0073284 | A1 * | 6/2002 | Fu et al. ......................... 711/137 |
| 2002/0181415 | A1 * | 12/2002 | West et al. ..................... 370/312 |
| 2002/0184208 | A1 * | 12/2002 | Kato .................................. 707/4 |
| 2003/0200194 | A1 * | 10/2003 | Arnold et al. ...................... 707/1 |
| 2003/0220908 | A1 * | 11/2003 | Chou ................................. 707/3 |
| 2004/0001104 | A1 * | 1/2004 | Sommerer et al. ............. 345/811 |
| 2004/0221233 | A1 * | 11/2004 | Thielen .......................... 715/530 |
| 2004/0249683 | A1 * | 12/2004 | Demarcken et al. ............... 705/5 |
| 2005/0094205 | A1 * | 5/2005 | Lo et al. ....................... 358/1.18 |

(Continued)

FOREIGN PATENT DOCUMENTS

CA 2472833 A1 * 1/2006
EP 1081611 A2 * 3/2001

(Continued)

OTHER PUBLICATIONS

Integrating layout into multi-media data retrieval, Cruz et al, AAAI Technical Report FS-99-04, 1999.*

(Continued)

Primary Examiner — Augustine K Obisesan
(74) Attorney, Agent, or Firm — Fish & Richardson P.C.

(57) ABSTRACT

Methods, program products, and systems for displaying data in formatted views using reference files are described. In some implementations, a database application program can generate a result set using one or more queries. The result set can contain actual data from a database and metadata. The metadata can contain references to data records in the database, the references can include identifiers that can identify the data records. When a user saves a database report file, the user can save at least a part of the result set using the identifiers instead of the queries and layouts. Thus, the result set can be saved as a reference file. When the database application program opens the saved reference file, the database application program can reproduce the result set using the stored references without running all of the queries.

21 Claims, 7 Drawing Sheets

(56) References Cited

U.S. PATENT DOCUMENTS

| | | |
|---|---|---|
| 2005/0097123 A1* | 5/2005 | Baek .............................. 707/102 |
| 2005/0160083 A1* | 7/2005 | Robinson .......................... 707/3 |
| 2005/0182761 A1* | 8/2005 | Kato ................................ 707/3 |
| 2005/0262059 A1* | 11/2005 | White .............................. 707/3 |
| 2006/0053091 A1* | 3/2006 | Dumitru et al. ................... 707/3 |
| 2006/0271508 A1* | 11/2006 | Wu et al. .......................... 707/2 |
| 2007/0174332 A1* | 7/2007 | Stephens ........................ 707/102 |
| 2007/0185836 A1* | 8/2007 | Handy-Bosma et al. ......... 707/3 |
| 2007/0203889 A1* | 8/2007 | Morgan ............................ 707/3 |
| 2007/0214112 A1* | 9/2007 | Towers et al. .................... 707/3 |
| 2007/0233958 A1* | 10/2007 | Wang ............................ 711/118 |
| 2007/0276811 A1* | 11/2007 | Rosen .............................. 707/3 |
| 2007/0282809 A1* | 12/2007 | Hoeber et al. ................... 707/3 |
| 2007/0299805 A1* | 12/2007 | Belinson .......................... 707/1 |
| 2008/0005668 A1* | 1/2008 | Mavinkurve et al. ......... 715/526 |
| 2008/0010171 A1* | 1/2008 | Ghanma .......................... 705/28 |
| 2008/0235608 A1* | 9/2008 | Prabhu .......................... 715/765 |
| 2008/0256096 A1* | 10/2008 | Nuthakki et al. ............. 707/100 |
| 2009/0019227 A1* | 1/2009 | Koski et al. ................... 711/133 |
| 2009/0157620 A1* | 6/2009 | Kim et al. ......................... 707/3 |
| 2009/0187558 A1* | 7/2009 | McDonald ....................... 707/5 |
| 2009/0307257 A1* | 12/2009 | Menon et al. ................. 707/102 |

FOREIGN PATENT DOCUMENTS

| | | | |
|---|---|---|---|
| WO | WO 0108033 A2 | * | 2/2001 |
| WO | WO 0195137 A2 | * | 12/2001 |
| WO | WO 2006096939 A1 | * | 9/2006 |
| WO | WO 2008148576 A1 | * | 12/2008 |

OTHER PUBLICATIONS

Retrieval of document images using layout knowledge, Herrmann et al, IEEE 1993.*

Using views for retrieving data for extremely heterogeneous databanks, Etzold et al, Pacific Symposium on Biocomputing, 1997.*

* cited by examiner

REFERENCE FILE FOR FORMATTED VIEWS

TECHNICAL FIELD

This disclosure relates generally to database applications.

BACKGROUND

Many modern database application programs include a query engine with a formatting tool. A user can use the query engine to build queries to retrieve data from the database, and use the formatting tool to display the data in a report in various formats. The queries and formatting information can be saved in the database application program. To reproduce the report, a conventional database application program reruns the query to retrieve data, reformats the retrieved data, and redisplays the result. The query can be complex and the data in the database may have been changed (e.g., a new record can be inserted into the database).

SUMMARY

Methods, program products, and systems for displaying data in formatted views using reference files are described. In some implementations, a database application program can generate a result set using one or more queries. The result set can contain actual data from a database and metadata. The metadata can contain references to data records in the database, the references can include identifiers that can identify the data records. When a user saves a database report file, the user can save at least a part of the result set using the identifiers instead of the queries and layouts. Thus, the result set can be saved as a reference file. When the database application program opens the saved reference file, the database application program can reproduce the result set using the stored references without running all of the queries.

Saving a result set as a reference file can achieve the following advantages. A reference file can capture records in the result set that are not results of a direct query (e.g., records manually added to the result set). The reference file can increase the likelihood that a formatted view reproduced later using the reference file contains the same records as the current formatted view. Reproducing a formatted view using a reference file rather than a query set can be more efficient when the database is large or when the query set contains complex queries that take a long time to execute. The reference file can contain references rather than actual code for queries, therefore can be compact and easily transportable (e.g., through email). A recipient of the reference file can reproduce the formatted view using a lightweight database application (e.g., an application that includes a light-weight database engine), without having to run complex queries.

The details of one or more implementations of using reference files for formatted views are set forth in the accompanying drawings and the description below. Other features, aspects, and advantages of reference files will become apparent from the description, the drawings, and the claims.

BRIEF DESCRIPTION OF THE DRAWINGS

Like reference symbols in the various drawings indicate like elements.

DETAILED DESCRIPTION

Reference File Techniques Overview

Figure 1A:
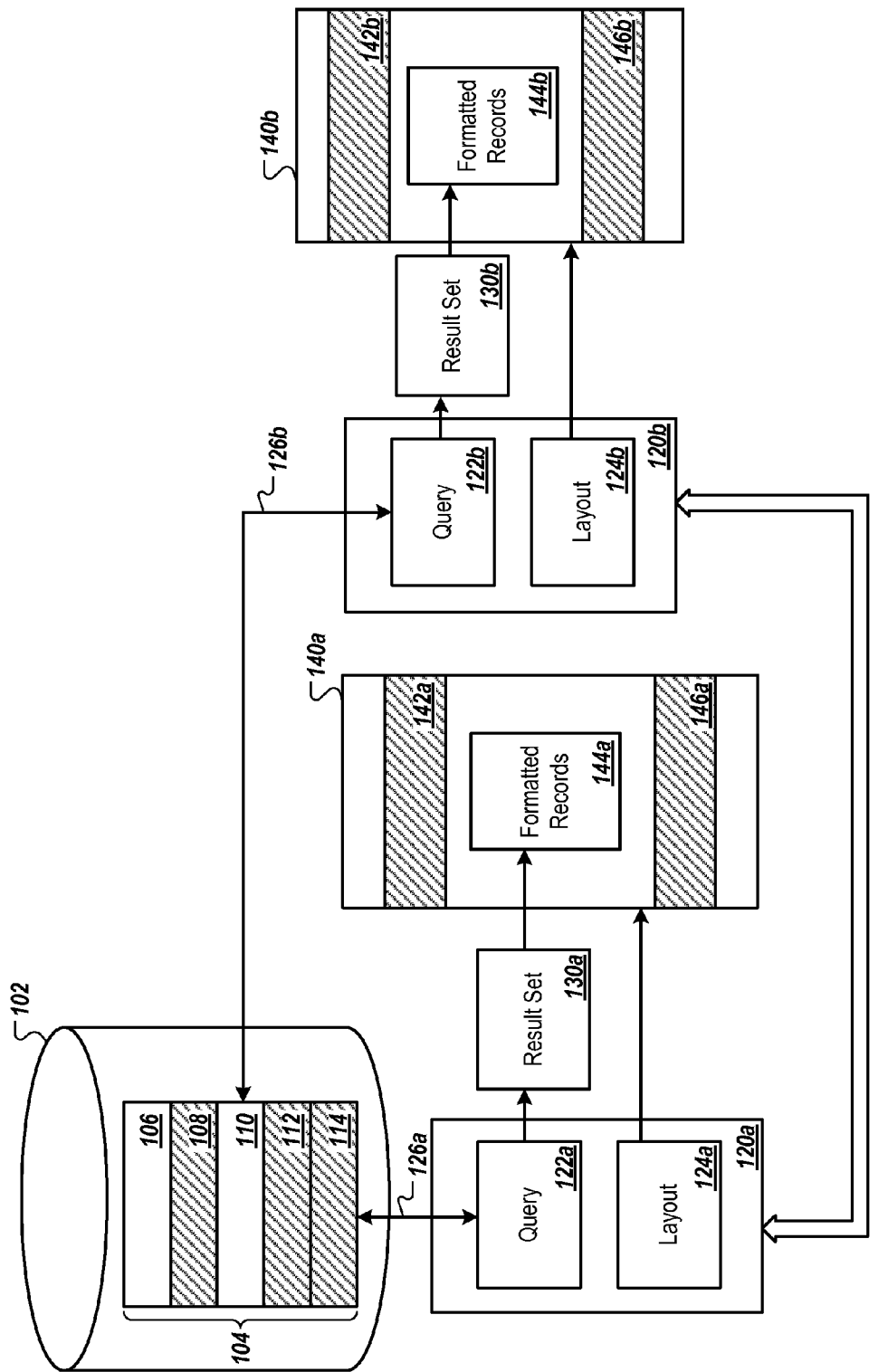
FIGS. 1A and 1B illustrate a comparison between a conventional database application program and a database application program using reference file techniques.
Figure 1B:
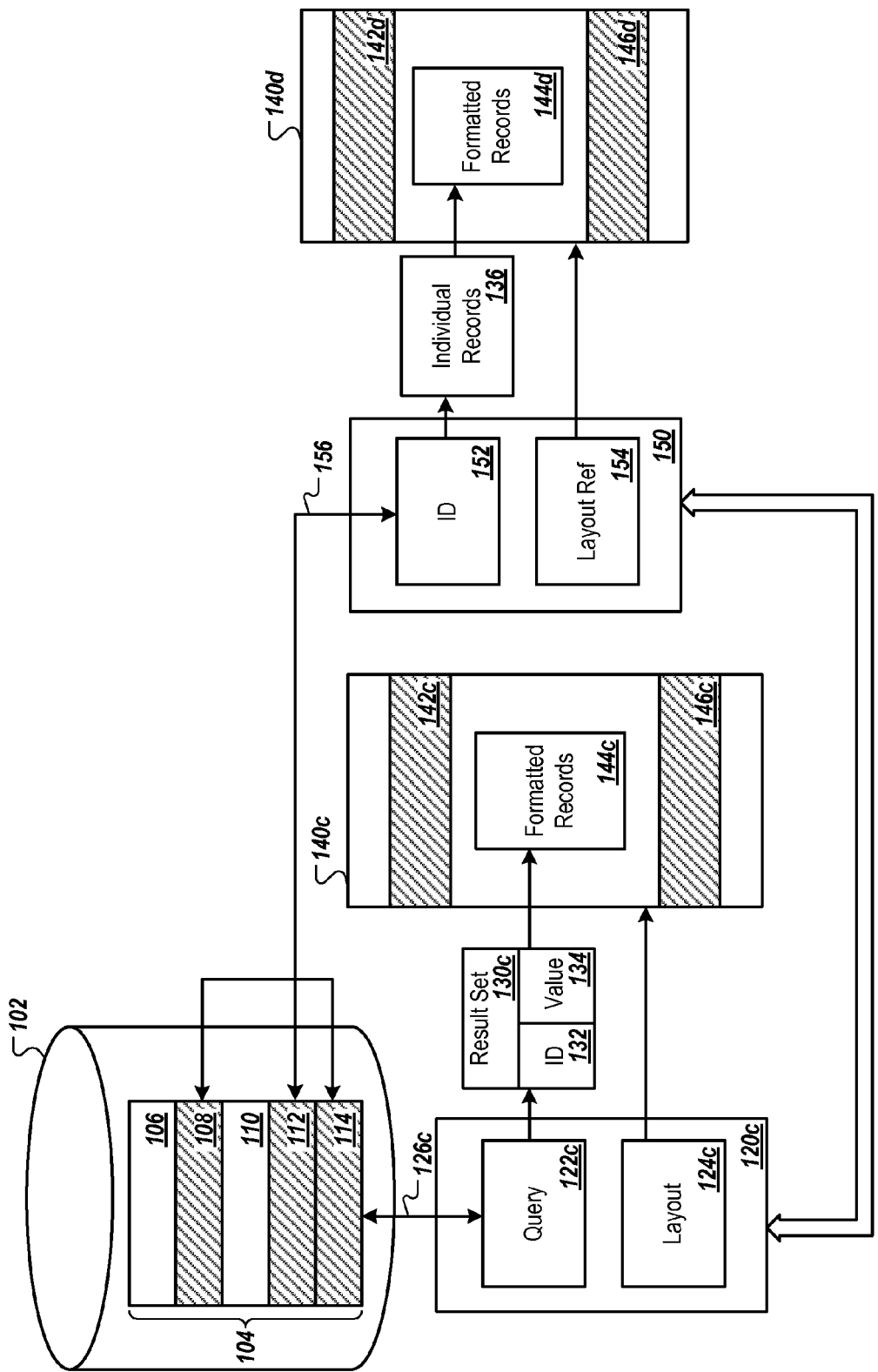

FIGS. 1A and 1B illustrate a comparison between a conventional database application program and a database application program using reference file techniques. For convenience, the exemplary implementations will be described with respect to a database reporting system that runs the application program, and a user using a database application program. Generally, the database reporting system can permit the user to view formatted data through an application program instead of directly accessing raw data stored in a database. A database application program can include various components, such as a query engine (for retrieving data from the database), a layout editor (for creating and editing layout for formatting data), and a formatting engine (for formatting and displaying the data using the layout). A user who is a database application developer can create a database application program, which can be run as a database application by the database reporting system, in a way similar to an operating system running an executable. An end user can create reports for viewing and printing using the database reporting system.

FIG. 1A illustrates a conventional database application program. A user creates database application program 120a for database 102. Database application program 120a running on the database reporting system. Database application program 120a can contain one or more query sets 122a for querying database 102, and layout 124 for formatting data retrieved from database 102. Query set 122a can retrieve records from database table 104 through database connection 126a. In response to query set 122a, data records (e.g., data records 108, 112, and 114) that satisfy certain criteria can be retrieved. The result of query set 122 can be stored in result set 130a, which can contain retrieved database records 108, 112, and 114 from database 102. Although query set 122a can be persistent, result set 130a can be transient. For example, result set 130a can exist in memory as long as a display window of the database application tool is open. The database reporting system can use layout 124a to format result set 130a to create formatted view 140a, which can include, for example, header 142a, body 144a that includes formatted database records 108, 112, and 114, and footer 146a.

The user can save database application program 120a as a separate database application program 120b (e.g., for sending to another user). Database application program 120b can include query set 122b and layout 124b, which can be identical to query set 122a and 124a. The database reporting system can execute database report 120b against database 102. At runtime, the database reporting system can open a new database connection 126b. The query set can retrieve records and store the retrieved records in result set 130b.

There is no guarantee that result set 130b contains the same records (e.g., database records 108, 112, and 114) as result set 130a. Because result set 130a can be transient, the content in result 130a is not saved. Between the executions of database application programs 120a and 120b, new records can be inserted into database table 104. Some fields of existing records in database table 104 can change (e.g., a sales number may be revised to go up). As a result, database records 106 and 110, which did not satisfy selection criteria defined in query set 122a when database application program 120a was executed, can satisfy selection criteria defined in query set 122b when database application program 120b was executed. Therefore, result set 130b can contain data records 106, 108, 110, 112, and 114. The database reporting system can use layout 120b to format result set 130b, creating formatted view 140b. Formatted view 140b can have the same general look and feel of formatted view 140a. For example, header 142b and footer 146b can be substantially identical to header 142a and footer 146a. However, because result set 130b contains more records than result set 130a, body section 144b can be different from body section 144a.

FIG. 1B illustrates database application program 120c implementing reference file techniques. Database application program 120c can contain query set 122c and layout 124c. Database application program 120c can also contain state information, which can track how a report is being viewed by a user. The state information, which can be saved with database application program 120c or separately, can include one or more current data viewing states. Data viewing states can include indicators of viewing mode, active data record (e.g., a record being edited), current view page, etc.

Through database connection 126c, one or more queries in query set 122c can access database table 104 and retrieve database records 108, 112, and 114. Retrieved database records 108, 112, and 114 can be stored in result set 130c. Result set 130c can be a found set. A found set can include a set of records in database table 104 that are made active by a find request. When all records are found, the found set can include all records in the entire table 104.

Result set 130c can contain data field values 134 from database records 108, 112, and 114 (e.g., values of database fields). In addition, result set 130c can contain record identifications 132. Record identifications 132 need not be explicitly retrieved by query 122c, but can be included by the system as a separate and hidden data structure in result set 130c. In various implementations, record identifications 132 can include internal record identifiers that reference database records 108, 112, and 114. These internal record identifiers can be provided at system level, e.g., as physical address of the data records. Although, in some implementations, record identifiers can be values in a database field that uniquely identifies a record in database table 104 (e.g., an "ID" field), it is not necessary that the record identifiers are stored in a particular database field.

The database reporting system can format the result set 130c using layout 124c to create formatted view 140c. Formatted view 140c can contain header 142c, body 144c, and footer 146c. The header 142c, body 144c, and footer 146c can be configured in layout 124c. Layout 124c can include an arrangement of data fields, objects, pictures, and layout parts that represents ways information is organized and presented when a user browses, previews, or prints data records. Layout 124c can contain various parts. A layout part is a section of layout 124c that organizes or summarizes information. For example, a header section can be a layout part that can contain, e.g., boilerplate text for an entire report, date and time, and other information generally related to a displayed view. A body section can be a layout part that can contain individual records retrieved from a database (e.g., the retrieved data).

Other layout parts can include footer, title header, title footer, leading and trailing grand summary, and leading and trailing sub-summary.

In the example shown, body 144c can be formatted according to formatting information (e.g., geometry, position, color, font, etc.) of a body section of layout 124c. Body 144c can contain some or all data field values 134 in result set 130c. In some implementations, record identification can be excluded from being rendered in body 144c (e.g., only actual data, rather than metadata, are displayed). For example, data fields in layout 124c can be limited to data field values 134. Thus, field values 134, rather than record identification 132, can be rendered in formatted view 104c.

Result set 130c can be transient, and can persist for as long as a window is open (e.g., when formatted view 104c is displayed). In addition, in some implementations, result set 130c can be invalidated when database connection 126c is closed. However, result set 130c can be saved as reference file 150. Reference file 150 can contain data identifiers 152, which can correspond to record identifications 132 in the result set 130c. Optionally, reference file 150 can contain other information. For example, reference file 150 can contain layout reference 154, which references layout 124c (which can be stored separately). Reference file 150 can also contain state information associated with database application program 120c. In addition, reference file 150 can also contain state information associated with states of a report that are more current than the states stored in database application program 120c. For example, when a view mode in database application program 120c is a browse mode but the user is in a report mode when saving reference file 150, the state saved in reference 150 can indicate a report mode.

Saving result set 130c as reference file 150 can include, for example, parsing result set 130c to collect record identifications 132, acquiring an ID of layout 124c, and examining the state information of the report. Record identifications 132 and the other information can be formatted using various formatting wrappers (e.g., XML tags) and saved as reference file 150. Reference file 150 can be copied, emailed, or stored in a file system as a conventional file.

The database reporting system can open reference file 150 upon user request (e.g., an "open file" command from a menu). Opening reference file 150 can trigger various processes, including, for example retrieving data set 136, which can contain data records from database 102. Retrieving data set 136 can differ from a standard query process (e.g., for retrieving result set 130c), because, in the former case, the database reporting system is not required to run queries of a query set (e.g., query set 122c) to retrieve data set 136. Instead, the database reporting system can retrieve individual records 108, 112, and 114 directly, using data identifiers 152. The retrieval can be accomplished using a direct database accessing module that uses data identifiers 152 to retrieve data. Another process triggered by opening reference file 150 can include establishing database connection 156 to connect to database 102. If a database connection already exists, the database reporting system can utilize the existing database connection rather than creating database connection 156. Because data identifiers 152 can identify individual database records (e.g., database records 108, 112, and 114), other database records 106 and 110 can be excluded from data set 136, even if database records 106 and 110 are added or modified such that they satisfy selection criteria in a query.

The database reporting system can apply layout 124c, as referenced by layout reference 154, to retrieved data set 136 to create formatted view 140d. Formatted view 140d can contain header 142d, body 144d, and footer 146d, each specified by layout 124c. Body 144d can include data from database records 108, 114, and 114, similar to body 144c in formatted view 140c.

Creating and Using Reference Files

Figure 2:
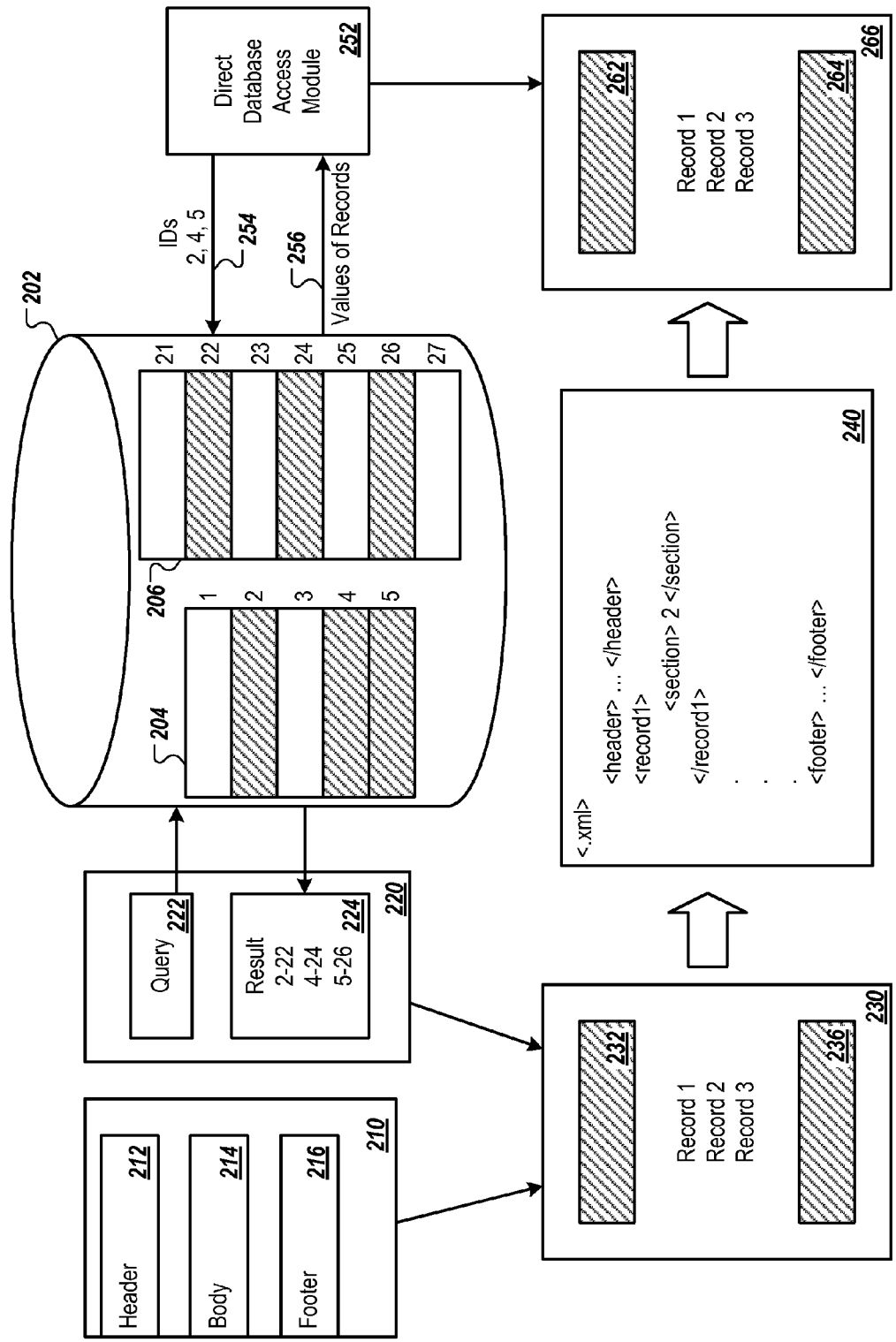
FIG. 2 illustrates exemplary implementations of reference file techniques for multi-part result sets.

FIG. 2 illustrates exemplary implementations of reference file techniques for multi-field result sets. Multi-field result sets can include data from multiple data fields from multiple tables. A reference file can contain references to the data fields as well as the tables. For convenience, the exemplary implementations will be described with respect to a database reporting system that performs the techniques, and a user using a database application program.

A database application program can include layout 210 (including header part 212, body part 214, and footer part 216). The database reporting system can also include database interface component 220, which can include query set 222. Query set 222 can retrieve data from both tables 204 and 206 in database 202. In some implementations (e.g., when database 202 is a structured query language (SQL) database), retrieving data from both tables 202 and 204 can be achieved using a select statement with a join clause.

By executing a query containing a join clause in query set 222, database interface component 220 can retrieve result set 224. Result set 224 can contain records including multiple data fields. The multiple data fields can come from records of both tables 204 and 206, as well as record identifications that correspond to internal identifiers of the records. The database records in tables 204 and 206 can each have an internal identifier (internal ID, e.g., 1, 2, 3, 4, 5, 21, 22, 24, 24, 25, 26, and 27). In some implementations, the internal ID can be the primary keys of tables 204 and 206. In some implementations, the internal ID can be an automatically generated address of each database record that is unique to the record and is not exposed to users. In some implementations, internal IDs can be a mixture of automatically generated addresses and primary keys (e.g., of external or foreign database tables).

In some implementations, an internal ID of a data record can include a table identifier and a record identifier. The table identifier can be used to identify in which table (e.g., table 204 or 206) the data record is located, as well as an address within the table (e.g., a row id of the data record, and a column ID of the field within the row). For example, the internal ID can have a form "204:2:3" which specifies that the data record is located at table 204, second row. In addition, the data field is at the third data column of that data record.

In this example, result set 224 can contain three data records. Each data record can contain one or more data fields and contain data about a single activity, individual, subject or transaction. A data record can be formed by a combination of data fields in both database table 204 and database table 206 (e.g., data field employee name from database table 204 and data field project name in database table 206, linked (e.g., joined) by an assigned project ID). In addition to values of various data fields in the records, result set 224 can also contain one or more record identifications for each record. For example, record identifiers 2-22 for a first record can indicate that the first record is formed by data from data record having internal ID "2" from database table 204 and from data record having internal ID "22" from database table 206.

The database reporting system can generate formatted view 230, which can include header 232 and footer 236 corresponding to header 212 and footer 216 in layout 210. A user can select to save result set 224 as reference file 240. Data in various database tables can be treated differently during the saving process, depending whether the table is a base table of a layout. For example, layout 210 can have base table 204 and related table 206. Base table 204 can be a default table for layout 224. A base table can be any table in a database. Related table 206 can be any database table that is related to base table 204 by one or more data columns. In some implementations, internal IDs of base table 204 are saved in reference file 240.

Optionally, reference file 240 can contain the following items, as well as other information that can be used to construct a second formatted view 266:

Links to one or more originating databases (e.g., database 202 from which the data records are retrieved). A link can be a database connection ID, a database connection object, or a database locator containing a path to or file name of the database;

References to layout 210 (e.g., a layout ID for uniquely identifying a layout stored on a storage system or a layout file name, if the layout is stored as a separate file);

A current mode (e.g., whether formatted view 232 is being viewed in a browse mode or in a preview mode). A browse mode can be a view mode in which a user can enter and edit information in data fields. A preview mode can be a view mode in which a user can see how layouts will look when they are printed;

A current view type (e.g., whether formatted view 232, in a browse mode, is being viewed in a form view, a list view, or a table view). In a form view, a user can view one record at a time. In a list view, a user can view records in a list. In a table view, a user can view records arranged in a spreadsheet-like table;

A current record ID (e.g., for identifying a particular data record that is active); and One or more current sort specifications (e.g., for specifying on which particular field the data records are sorted).

Reference file 240 can have various formats, e.g., binary format or text format. In some implementations, a text-based format (e.g., Extensible Markup Language (XML) format) can be used. Using a text-based format (e.g. XML) can be advantageous under certain conditions, e.g., when reference file 240 is attached to an email, because an email program is not required to Base-64 encode a text-based reference file 240.

The database reporting system can open the saved reference file 240 automatically (e.g., triggered by receiving an email containing reference file 240 on a server) or upon a user request. The database reporting system can include direct database access module 252, which can retrieve database records using internal identifiers and without running a database query. For example, direct database access module 252 can submit internal identifiers 2, 4, and 5 in a request 254 to database 202. Database 202 can use internal identifiers 2, 4, and 5 to locate specific data records in database tables 204 and 206, and return values of the located data records in response 256. The located data records can be sent to a formatter to generate formatted view 266. The formatter can be a component of the database reporting system that formats data using one or more layouts.

In some implementations where internal IDs of base table 204 are saved in reference file 240, data from related table 206 can be retrieved by performing the join operation again, because internal IDs 22, 24, and 26 are not saved. However, the join operation can be limited to the set of base table IDs in reference file 240.

An example including an Employee table (e.g., base table 204) and a Project table (e.g., related table 206) can be used to illustrate how data from related table 206 can be retrieved.

Base table 204 and related table 206 can be related by a field (e.g., Project ID). Layout 210 can be designed to show a Project Name field (stored in related table 206) for each employee. After reference file 240 is loaded, an implicit query can be performed matching the records from table 204, which can be identified in the reference file, with records from related table 206 whose Project ID field values are equal. Although a list of employees that is shown on formatted view 266 can be the same list as the time reference file 240 was saved, the Project ID and the corresponding Project Name values can differ. This can be permissible. Although the particular snapshot of which employees were viewed at the time was restored, the expectation can be that formatted view 266 is displaying correct and up-to-date information.

Optionally, the formatter can locate layout 210 using a layout reference stored reference file 240 to create header 262 and footer 264 in formatted view 266. In addition, the formatter can use other information contained in reference file 240 (e.g., current mode, view type, etc.) to display formatted view 266 in a way that corresponds to the mode and view type of formatted view 230 when reference file 240 was saved.

Figure 3:
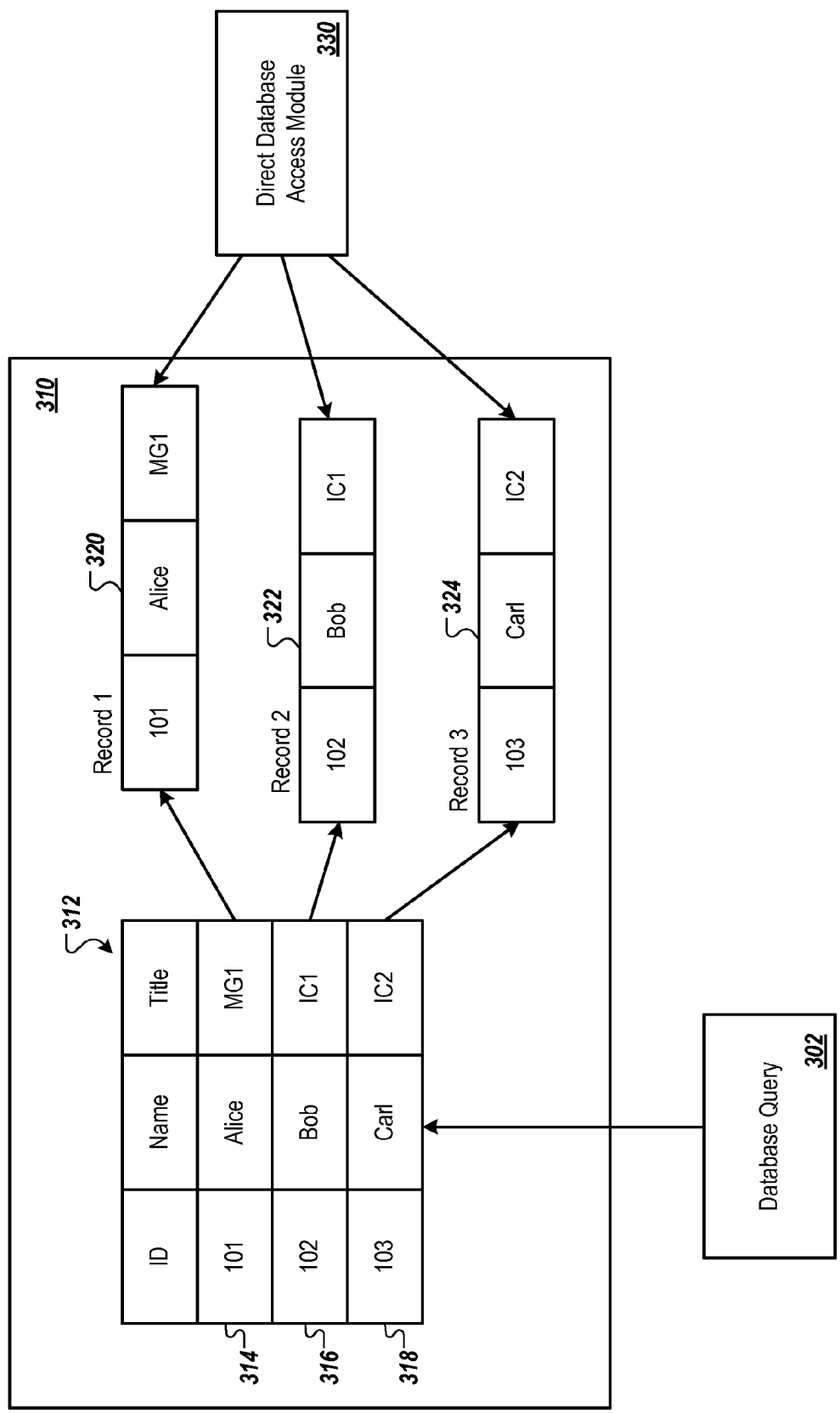
FIG. 3 illustrates exemplary techniques for directly referencing database records.

FIG. 3 illustrates exemplary techniques for directly referencing database records. Database 310 can include database table 312, which can include data columns as well as data rows 314, 316, and 318. Data columns for database table 312 can include column "ID" that contains data fields for primary keys (e.g., "101," "102," and "103" for data records 314, 316, and 318, respectively), column "Name" that contains data field for employee names (e.g., "Alice," "Bob," and "Carl"), and column "Title" that contains job title for each employee (e.g., "manager 1," "individual contributor level 1," and "individual contributor level 2"). In some implementations, the primary keys in the "ID" column are distinct from the internal IDs. For example, a user can write a query statement to retrieve the primary key; however, the same user can be prohibited from accessing the internal ID of the rows of table 312.

Database query 302 (e.g., a SQL "SELECT" statement) can be used to retrieve data in database table 312. Database query 302 can be a typical query in query set 122 or 222. Query 302 does not access data fields directly or individually. From a viewpoint of database query 302, database table 312 can be an atomic unit of operation (e.g., query 302 does not divide database table 312 into sub-parts to retrieve individual records). If query 302 needs to access a subset of table 312, a query that creates views or temporary tables can be utilized. However, in these situations, the view or temporary tables are the new atomic units of operation.

In some implementations, database records 314, 316, and 318 can be stored at different locations (e.g., at non-consecutive addresses 320, 322, and 324, respectively). Each of database records 314, 316, and 318 can be located by a reference (e.g., an internal ID) that can be hidden from a user. Data fields can be retrieved from addresses 320, 322, and 324 transparently from the user. For example, during data retrieval, a process can identify the internal IDs using table schema and query logic, as well as the internal IDs. The identification process can be hidden from the user. The internal IDs can be sent together with the retrieved data fields, but in a separate and hidden data structure. For example, if the retrieved data are stored in a result object as public instance variables, the internal IDs can be stored as private or protected instance variables. UI components can be prevented from accessing the private or protected instance variables.

In some implementations, to retrieve data using reference file 240, the database reporting system can use direct database access module 330 to access addresses 320, 322, or 324 directly, using the internal IDs. Using internal IDs to access addresses 320, 322, or 324 directly can reduce the number of steps database 310 has to perform to retrieve data (e.g., no query interpretation is necessary). Data retrieval using direct access can be consistent when new records are inserted into database table 312. For example, if new records are inserted, the direct database access module can still retrieve the original three records. If a value of a data field is updated (e.g., when job title for Carl is changed from "IC 2" to "MG 1"), direct database access module 330 can retrieve data reflecting the change because the update can occur at address 324. If a database record (e.g., data record 316) is deleted, data at address 322 can be removed. Direct database access module 330 can use various techniques (e.g., default action, exception handling, or other mechanisms) to handle the situation.

Exemplary Reference File Creation, Transmission, and Receipt

Figure 4:
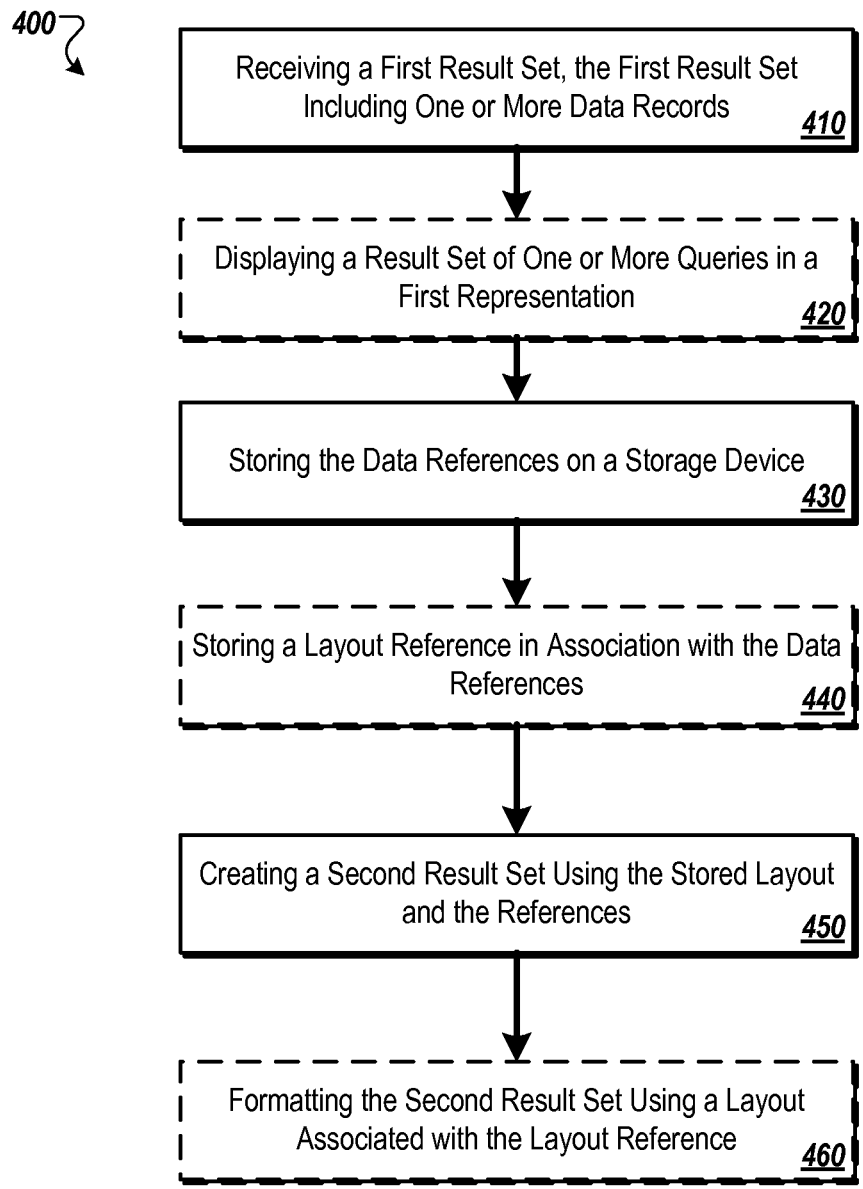
FIG. 4 is a flowchart illustrating an exemplary process for creating, transmitting, and opening of reference file techniques.

FIG. 4 is a flowchart illustrating an exemplary process 400 for creating, transmitting, and opening of reference file techniques. For convenience, the exemplary implementations will be described with respect to a database reporting system that performs the techniques, and a user using a database application program.

The database reporting system can receive (410) a first result set (e.g., 130c). First result set 130c can include one or more data records retrieved from database 102 using one or more queries in query set 122c. First result set 130c can include data references (e.g., record identifications 132) to the data records. The data references can include internal record identifiers corresponding to the data records in database 102. The record identifiers are "internal" because they can be hidden from application developers or end users.

Optionally, the database reporting system can display (420) first result set 130c in a first representation (e.g., formatted view 140c). Formatted view 140c can include user interface (UI) components that allow the user to invoke a "save as reference file" feature. The "save as reference file" can be accessible from a menu item on a file menu, or from an icon. The file menu and the icon can be implemented using a menu bar on formatted view 140c.

Invoking the "save as reference file" feature can include opening a dialog box for the feature. The dialog box can allow the user to specify a file name for reference file 150. Reference file 150 can have a default name, e.g., a name of database application program, a name of an active database window, a name of a database, etc.

The dialog box can also include a component that can permit a user to configure the database reporting system such that reference file 150 is attached to an automatically generated email. The component, when activated, can cause the database reporting system to launch a default email client after saving reference file 150 and create a new message. Reference file 150 can be attached to the message. If no default email client exists or if problems occur launching the default email client, the database reporting system can either take no action or invoke error processing functions (e.g., logging an error in a log file).

The database reporting system can store (430) reference file 150 on a storage device. In some implementations, the database reporting system can store (440) layout reference 154 as a part of reference file 150. Layout reference 154 can include a pointer to or an identifier of a layout (e.g., layout 124c) that is currently being used to format result set 130c. In some implementations, the user can specify a layout to which layout reference 154 refer. For example, the user can be given an option of using the current layout 124*c* or another layout.

Upon opening reference file 150, the database reporting system can create (450) a second result set (e.g., result set 130*b*) using the stored reference file 150. Creating result set 130*b* can include directly retrieving data records from database 102 using the internal record identifiers in the reference file 150.

Optionally, the database reporting system can format (460) the second result set (e.g., result set 130*b*). Formatting result set 130*b* can include retrieving layout reference 154 from reference file 150, retrieving layout 124*c* to which layout reference 154 refers, and creating a formatted view (e.g., formatted view 140*d*) using the retrieved layout. Result set 130*b* can be displayed in the formatted view 240*d*.

Figure 5:
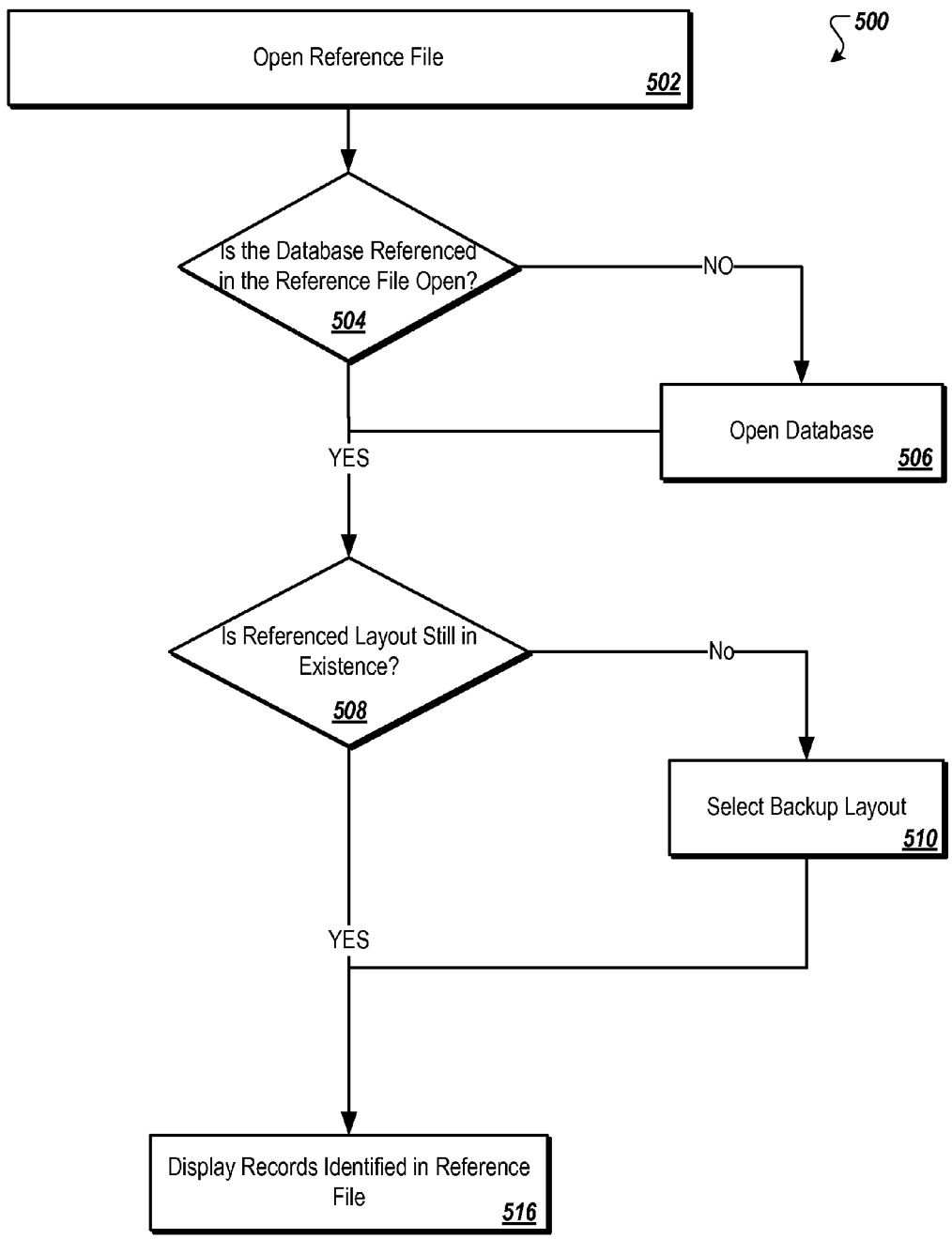
FIG. 5 is a flowchart illustrating an exemplary process for creating a formatted view using a reference file.

FIG. 5 is a flowchart illustrating an exemplary process 500 for creating a formatted view using a reference file. For convenience, the exemplary implementations will be described with respect to a database reporting system that performs the techniques, and a user using a database application program.

The database reporting system can open (502) reference file 150. The database reporting system can accept reference file 150 for opening based on an extension file name that has been registered with an operating system. The behavior of opening reference file 150 can correspond to the behavior of executing a regular database application program for running a query or selecting a layout (e.g., opening a connection, retrieving data, and formatting the data). In some implementations, if the user has insufficient privileges to view the layout referenced in reference file 150 or insufficient privileges to access the database in reference file 150), the database reporting system can display a "no access" prompt.

The database reporting system can determine (504) if a source (e.g., database 102) referenced in reference file 150 is already open. Reference file 150 can include a data source reference that identifies database 102 from which result set 130*c* was retrieved. A data source can be a named reference that provides access to a database file or an Open Database Connectivity (ODBC) data source (e.g., an external SQL database). A database file can include a collection of information in a file containing one or more tables pertaining to a subject, such as customers or invoices. A database can include one or more database files.

The database reporting system can examine a connection pool and determine if an open connection to database 102 (e.g., an opened database file or an ODBC connection) exists. If a connection does not exist already, the database reporting system can attempt to open (506) the connection automatically. The database reporting system can first attempt to open the connection using a remote path. The remote path can identify a database on a remote server (e.g., a server identifiable using an IP address). If the attempt to open the connection using the remote path fails, the database reporting system can attempt to open the connection using a local path. The local path can identify a database on a local server, for example, by identifying a database file stored locally. If database 102 (e.g., a remote database identified in a database path or a local database in the form of one or more database files, identified in a file path) is unavailable because the user lacks privilege, the database reporting tool can provide a standard error message indicating that the database cannot be opened or cannot be found.

If a connection (e.g., connection 156) to database 102 is already open, the database reporting system can create a new database window upon the opening of reference file 150. The window can be used to display formatted view 140*d*. Displaying formatted view 140*d* can include restoring states (e.g., view mode) of formatted view 140*d* to prior states of formatted view 140*c* when reference file 150 was saved. The window can include a window name, which can be based on a name of reference file 150.

The database reporting system can determine (508) whether referenced layout (e.g., layout 124*a*) still exists. If referenced layout 124*a* is no longer in existence, the database reporting system can select (510) a backup layout. The backup layout can be a layout that is associated with a relevant database table (e.g., database table 104 from which result set 130*a* was retrieved). If no such layout exists, or if the relevant database table 104 has been deleted, the database reporting system can invoke an error processing process, which can provide an error message in a UI, informing the user that records cannot be displayed because either the table no longer exists or no layout based on the table exists in referenced database 102.

The database reporting system can display (516) records identified in reference file 150. The states (e.g., viewing modes) stored in reference file 150 can be restored.

After the creation of reference file 150, data records in database 102 can change (e.g., they can be modified by various database queries). If a data record identified in reference file 150 is deleted after reference file 150 was created, the database reporting system can display a warning, informing the user that some or all of the records in reference file 150 are no longer available in the referenced database, and that only the remaining available records will be shown. If the current record (e.g., an active record) is one of the deleted records, the first available record in result set 130*b* can be made active.

Exemplary Reference File

The following list illustrates content of an exemplary reference file (e.g., reference file 150).

```
<?xml version="1.0" encoding="UTF-8"?>
<RFTAG>
    <UIState>
        <UniversalPathList>
            dbnet:/192.168.1. 197/sample database
            filemac:sample.fp7
        </UniversalPathList>
        <Rows type="nativeIDList" rowCount="6" baseTableId="129">
            <![CDATA[1 2 4 9 10 11]]>
        </Rows>
        <Layout id="5"></Layout>
        <View type="form"></View>
        <SelectedRow type="nativeID" id="1"></SelectedRow>
        <StatusToolbar visible="True"></StatusToolbar>
        <Mode value="browseMode"></Mode>
        <SortList value="True">
            <Sort type="Ascending">
                <PrimaryField>
                    <Field tableId="1065090" table="d1table1"
                    id="1"
                        name="d1"></Field>
                </PrimaryField>
            </Sort>
        </SortList>
    </UIState>
</RFTAG >
```

LIST 1. Exemplary Reference File

The exemplary reference file shown in LIST 1 can be a file in XML format. In some implementations, a schema of the reference file (e.g., a document type definition, DTD, which can include a formal description of a particular type of XML)

can be omitted, when the reference file is limited to private use (e.g., used by a specific database reporting system).

The reference file can contain an XML declaration element stating the XML version of the reference file, and a root element (e.g., enclosed by the <RFTAG> and </RFTAG> tags). The root tag can include a UIState element for defining a state of a formatted view (e.g., formatted view 140*d*).

An element "Universal Path List" can be used to reference a database (e.g., database 102) from which result set 130*a* is retrieved. The universal path list element can contain references to one or more remote databases, which can be specified using a uniform resource locator (URL, e.g., "dbnet:// 192.168.1.197/sample database") and one or more local databases, which can be specified using a file path (e.g., "filemac:sample.fp7"). A remote database can be hosted on a local machine and accessed through local port (e.g., "localhost://127.0.0.1/sample database").

A "Rows" element can be used to specify the data records to be retrieved. The "Rows" element can include a "type" element, which specifies what type of record identifications (e.g., record identifications 132) are contained in the reference file. For example, a type of rows can be "nativeIDList," which can indicate that the record identifications are internal record identifiers. Type of rows can alternatively include primary keys of a database table, and identifier field of a database table, etc. The "Rows" element can further include a baseTableId attribute, identifying an internal identifier of a table. The "Rows" element can also contain a rowCount attribute, which can indicate the length of the data (e.g., a number of the data records referenced). The rowCount can be used for error checking and for other purposed. The "Rows" element can include character data (CDATA) that includes the record identifications.

The reference file can include various other elements that specify display options. For example, a "Layout" element can be used to reference a layout (e.g., layout 124*c*) based on which an original formatted view (e.g., formatted view 140*c*) is displayed. The "Layout" element can include an attribute "id" which identifies the layout, which can be stored as a file or as a database item. A "View" element and a "type" attribute can be used to specify a view type (e.g., "form," "list," or "table"). A "SelectedRow" element and an "id" attribute can be used to specify which row is a "current" row (e.g., an active row). A "StatusToolbar" element and a "visible" attribute can be used to specify what a status toolbar is visible in a formatted view (e.g., formatted view 140*d*). A "Mode" element and a "value" attribute can be used to specify whether the formatted view is in a browse mode or preview mode.

The reference file can also include a "SortList" element that can specify whether the formatted view contains a sort specification. The "SortList" element can include a "Sort" sub-element, which can specify whether data records should be sorted in ascending or descending order. A "PrimaryField" element can be used to specify one or more fields for sorting.

The reference file in LIST 1 is shown in XML format. In various implementations, a reference file can be saved using other formats, including binary format.

Example System Architecture

Figure 6:
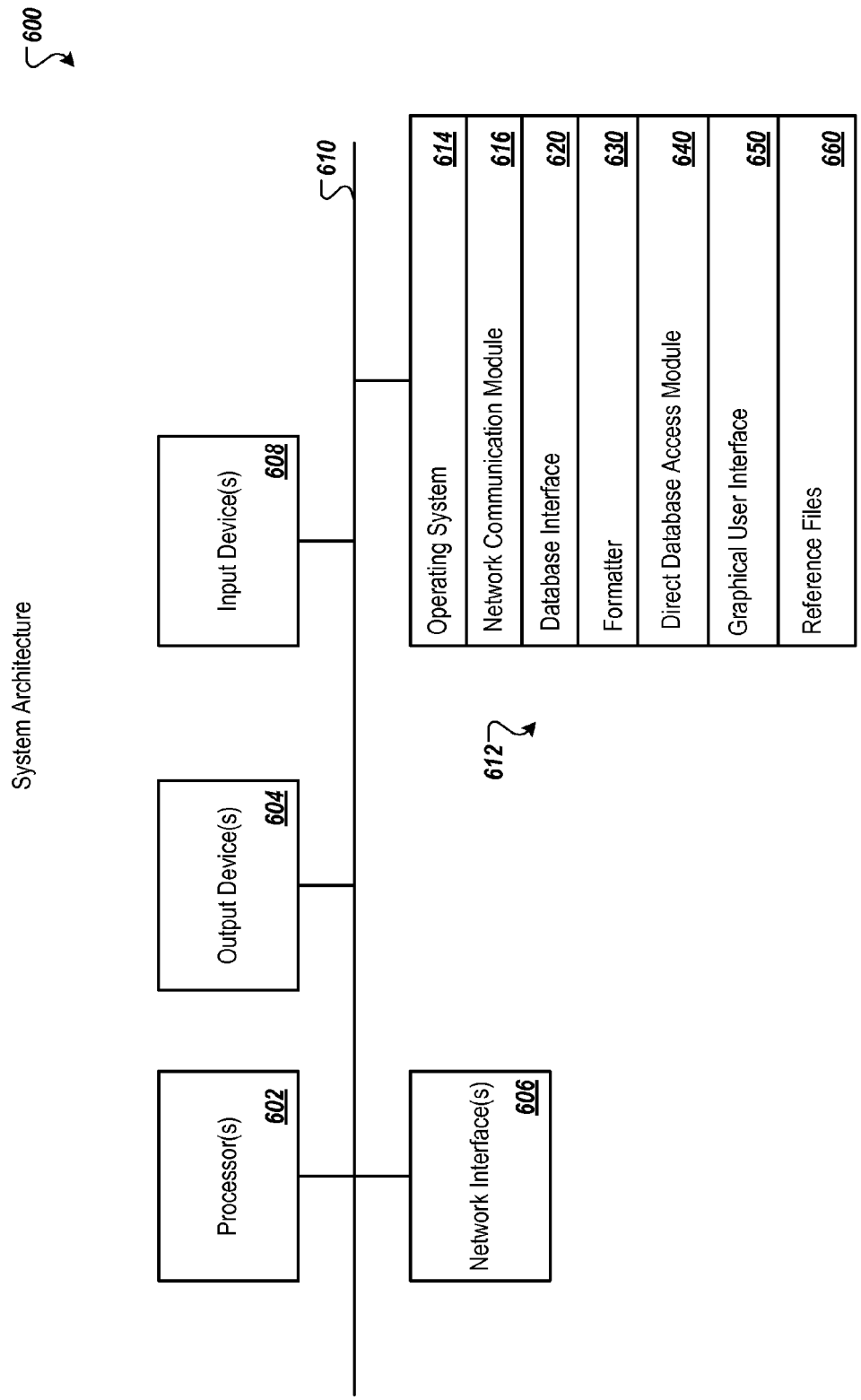
FIG. 6 is a block diagram of an exemplary system architecture for implementing the features and operations described in reference to FIGS. 1-5.

FIG. 6 is a block diagram of an exemplary system architecture 600 for implementing the features and operations described in reference to FIGS. 1-5. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to any medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 612 can further include operating system 614 (e.g., Mac OS® server, Windows® NT server), network communication module 616, database interface 620, formatter 630, direct database access module 640, graphical user interface 650, and reference files 660, as described in reference to FIGS. 1-5. Operating system 614 can be multi-user, multiprocessing, multitasking, multithreading, real time, etc. Operating system 614 performs basic tasks, including but not limited to: recognizing input from and providing output to devices 606, 608; keeping track and managing files and directories on computer-readable mediums 612 (e.g., memory or a storage device); controlling peripheral devices; and managing traffic on the one or more communication channels 610. Network communications module 616 includes various components for establishing and maintaining network connections (e.g., software for implementing communication protocols, such as TCP/IP, HTTP, etc.). Direct database access module 640 can include one or more functional components for retrieving a data record from a database using an internal identifier. Reference files 660 can include data values, data record identifications, references to layouts, display modes, and other data and formatting information.

Architecture 600 can be included in any device capable of hosting a database application program. Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. Accordingly, other implementations are within the scope of the following claims.

For example, the term "database" can refer to any structured collection of data that is stored on a computer system, including, for example, a relational database, an object-oriented database, a file system, an indexed collection of documents, or any structured data. The term "query" can refer to any request for information retrieval, including, for example, a SQL query, a search request, or a request into a file system. The term "database reporting system" can refer to any system that accepts queries, identifies information using the queries, and presents the identified information to a user in a formatted view. A database reporting system can include, for example, a Relational Database Management System (RDBMS), a desktop file indexing system, or an Internet search engine. The term "reference file" is not limited to a stand-alone file, but can include, for example, a set of two or more files, a body of an electronic mail message, or a data structure stored on a disk, on a flash drive, or in memory of a computer system.

What is claimed is:

1. A computer-implemented method, comprising:
receiving a first data request to save a formatted view of data, the formatted view of data being defined by a query to a database and a layout, the layout including formatting information for arranging, in the formatted view, a data record retrieved from the database using the query;
in response to the first data request, storing a database report file on a storage device that is different from the database, wherein storing the database report file comprises:
storing a data reference to the data record, the data reference including an address of the data record, the address indicative of where a value of the data record is stored in the database; and
storing the formatting information in association with the data reference;
receiving a second data request to open the database report file to recreate the formatted view of data;
in response to the second data request, retrieving the record from the database using direct access into the database, the direct access being different from a database query and including retrieving one or more values of the data record using the address in the data reference, wherein, when the one or more values of the data record in the database have been updated and are different from values of the data record in the formatted view of data at time of saving, the data record retrieved using the address includes updated information from the database; and
recreating the formatted view of data using the data record retrieved from the database using the address, wherein recreating the formatted view comprises arranging the data record including one or more updated data values according to the formatting information stored in association with the data record in the database report file.

2. The method of claim 1, wherein storing the formatting information comprises:
storing a layout reference to the layout in association with the data reference.

3. The method of claim 2, wherein recreating the formatted view comprises:
retrieving the layout using the stored layout reference; and
arranging the data record using formatting information in the retrieved layout.

4. The method of claim 3, wherein retrieving the layout comprises:
determining whether the stored layout reference points to a valid layout; and
upon a finding that the stored layout reference does not point to a valid layout, retrieve a replacement layout, the replacement layout including a layout based on a table from which the data record is received.

5. The method of claim 1, further comprising:
storing, in association with the data reference:
a state of a current view;
a state of a sort specification;
a state of a view mode; and
a visibility state of a status tool bar.

6. The method of claim 1, wherein the address includes a table identifier identifying a data table in the database, a row identifier identifying a data row in the data table, and a field identifier identifying a data field in the data row.

7. The method of claim 1, wherein retrieving the data record includes:
determining whether a connection to the database is open;
upon determining that the connection is open, retrieving the data record using the connection;
upon determining that the connection is not open,
opening a new connection to the database; and
retrieving the data record using the new connection.

8. A computer program product encoded on a non-transitory computer storage medium, operable to cause data processing apparatus to perform operations comprising:

receiving a first data request to save a formatted view of data, the formatted view being defined by a query to a database and a layout, the layout including formatting information for arranging, in the formatted view, a data record retrieved from the database using the query;

in response to the first data request, storing a database report file on a storage device that is different from the database, wherein storing the database report file comprises:

storing a data reference to the data record, the data reference including an address of the data record, the address indicative of where a value of the data record is stored in the database; and storing the formatting information in association with the data reference;

receiving a second data request to open the database report file to recreate the formatted view of data;

in response to the second data request, retrieving the data record from the database using direct access into the database, the direct access being different from a database query and including retrieving one or more values of the data record using the address in the data reference, wherein, when the one or more values of the data record in the database have been updated and are different from values of the data record in the formatted view of data at time of saving, the data record retrieved using the address includes updated information from the database; and recreating the formatted view of data using the data record retrieved from the database using the address, wherein recreating the formatted view comprises arranging the data record including one or more updated data values according to the formatting information stored in association with the data record in the database report file.

9. The product of claim 8, wherein storing the formatting information comprises:

storing a layout reference to the layout in association with the data reference.

10. The product of claim 9, wherein recreating the formatted view comprises:

retrieving the layout using the stored layout reference; and arranging the data record using formatting information in the retrieved layout.

11. The product of claim 10, wherein retrieving the layout comprises:

determining whether the stored layout reference points to a valid layout; and upon a finding that the stored layout reference does not point to a valid layout, retrieve a replacement layout, the replacement layout including a layout based on a table from which the data record is received.

12. The product of claim 8, the operations further comprising:

storing, in association with the data reference:
a state of a current view;
a state of a sort specification;
a state of a view mode; and
a visibility state of a status tool bar.

13. The product of claim 8, wherein the address includes a table identifier identifying a data table in the database, a row identifier identifying a data row in the data table, and a field identifier identifying a data field in the data row.

14. The product of claim 8, wherein retrieving the data record includes:

determining whether a connection to the database is open;

upon determining that the connection is open, retrieving the data record using the connection;

upon determining that the connection is not open,
opening a new connection to the database; and
retrieving the data record using the new connection.

15. A system comprising:

one or more computers; and a computer program product encoded on a non-transitory computer storage medium, operable to cause the one or more computers to perform operations comprising:

receiving a first data request to save a formatted view of data, the formatted view being defined by a query to a database and a layout, the layout including formatting information for arranging, in the formatted view, a data record retrieved from the database using the query;

in response to the first data request, storing a database report file on a storage device that is different from the database, wherein storing the database report file comprises:

storing a data reference to the data record, the data reference including an address of the data record, the address indicative of where a value of the data record is stored in the database; and storing the formatting information in association with the data reference;

receiving a second data request to open the database report file to recreate the formatted view of data;

in response to the second data request, retrieving the data record from the database using direct access into the database, the direct access being different from a database query and including retrieving one or more values of the data record using the address in the data reference, wherein, when the one or more values of the data record in the database have been updated and are different from values of the data record in the formatted view of data at time of saving, the one or more data record retrieved using the address includes updated information from the database; and recreating the formatted view of data using the data record retrieved from the database using address, wherein recreating the formatted view comprises arranging the data record including one or more updated data values according to the formatting information stored in association with the data record in the database report file.

16. The system of claim 15, wherein storing the formatting information comprises:

storing a layout reference to the layout in association with the data reference.

17. The system of claim 16, wherein recreating the formatted view comprises:

retrieving the layout using the stored layout reference; and arranging the data record using formatting information in the retrieved layout.

18. The system of claim 17, wherein retrieving the layout comprises:

determining whether the stored layout reference points to a valid layout; and upon a finding that the stored layout reference does not point to a valid layout, retrieve a replacement layout, the replacement layout including a layout based on a table from which the data record is received.

19. The system of claim 15, the operations further comprising:
    storing, in association with the data reference:
        a state of a current view;
        a state of a sort specification;
        a state of a view mode; and
        a visibility state of a status tool bar.

20. The system of claim 15, wherein the address includes a table identifier identifying a data table in the database, a row identifier identifying a data row in the data table, and a field identifier identifying a data field in the data row.

21. The system of claim 15, wherein retrieving the data record includes:
    determining whether a connection to the database is open;
    upon determining that the connection is open, retrieving the data record using the connection;
    upon determining that the connection is not open,
        opening a new connection to the database; and
        retrieving the data record using the new connection.

\* \* \* \* \*

UNITED STATES PATENT AND TRADEMARK OFFICE
CERTIFICATE OF CORRECTION

PATENT NO. : 8,700,646 B2
APPLICATION NO. : 12/540056
DATED : April 15, 2014
INVENTOR(S) : Vladimir Brad et al.

It is certified that error appears in the above-identified patent and that said Letters Patent is hereby corrected as shown below:

In the Claims,

Column 14, Line 13 at Claim 1; replace:

"in response to the second data request, retrieving the record" with

-- in response to the second data request, retrieving the data record --

Signed and Sealed this
Twenty-fourth Day of February, 2015

Michelle K. Lee
*Deputy Director of the United States Patent and Trademark Office*